May 27, 1969    L. SOMAZZI    3,446,553
DEVICE TO BE APPLIED TO ANALYTIC RESTITUTERS FOR
OBTAINING ORTHOPHOTOPLANES
Filed Oct. 29, 1965      Sheet 1 of 3

INVENTOR

LINO SOMAZZI

BY Young + Thompson

ATTORNEYS

United States Patent Office 3,446,553
Patented May 27, 1969

3,446,553
DEVICE TO BE APPLIED TO ANALYTIC RESTITUTERS FOR OBTAINING ORTHO-PHOTOPLANES
Lino Somazzi, Albonago di Viganello, Switzerland, assignor to Kassel Anstalt, Vaduz, Liechtenstein
Filed Oct. 29, 1965, Ser. No. 505,622
Claims priority, application Switzerland, June 11, 1965, 8,362/65
Int. Cl. G03b 27/68
U.S. Cl. 355—47                 5 Claims

ABSTRACT OF THE DISCLOSURE

Apparatus for obtaining a cylindrical projection of stereo pairs of photographs in conical projection in aerial photography comprises an analytic restituter consisting of a stereo comparator with two plates for photographs, each of which plates is movable along two cartesian coordinates by means of precision screws controlled by a previously programmed computer. A slot scans one of the two photographs of the restituter and projects the scanned image on a sensitive surface through an optical enlargement system. This system comprises means for automatically varying the enlargement ratio between the size of the slot on the photographic plate and the size of its image on the sensitive surface as a function of elevation of the ground contour scanned, thereby to convert the conical projection into a cylindrical projection.

---

The object of the present invention is to automatically obtain orthophotography, that is, photograph in a cylindrical projection by starting from stereo-pairs obtained by means of successive photographs from an airplane.

According to the invention there is to be utilized an instrument of the "analytic restituter" type such as the one described in the U.S. patent application 680,699 filed on Aug. 28, 1957 and now abandoned, corresponding to Swiss Patent 355,959 filed on Aug. 14, 1958 and Italian Patent 638,671 which instrument is to have mounted thereon the devices to be described hereinafter which are intended to give the desired results.

For a better understanding of the following description it is deemed necessary to briefly summarize the operation of an analytic restituter.

An analytic restituter substantially consists of a stereocomparator with two plates in which the movements along the four cartesian coordinates (two for each plate) constituting the photographic coordinates are operated by means of precision screws that are controlled by a previously programmed electronic computer. The electronic computer receives the following input quantities:

(a) Fixed quantities consisting of the constants of the relative and absolute inner orientation of the pair of photographs under examination as well as the constants of systematic correction which one has chosen to initially introduce (distortion of photograph, contraction of the film, atmospheric refraction, etc.).

(b) As variable quantities it receives three cartesian coordinates of the solid model, the expression "model" being used to indicate the reproduction, in a determinate reduced scale, of that portion of the photographed ground which is common to the two utilized photographs.

The plane coordinates (X and Y) of the model, which are usually traced by the operator by means of two handwheels, are transformed into coded information for the electronic computer which processes them as a function of the program by which it has been conditioned and which restitutes:

(a) To the stereocomparator the photographic coordinates (plate coordinates) which maintain the alignment of the lines of optical observation on the homologous points of the ground, so that the operator does not lose the stereoscopic collimation.

(b) To the tracing table the same coordinates of the model multiplied by a scale factor which the operator chooses according to his own requirements.

The mentioned numerical quantities, given by the electronic computer, are transformed into translations by means of servo-mechanisms disposed on the stereocomparator and on the tracing table.

The device according to the present invention is characterized in that a slot scans one of the two photographs of the restituter, projecting the so-scanned image through an optical enlargement system which reproduces it on the sensitive surface to form the orthophotogram thereon.

Figure 1:
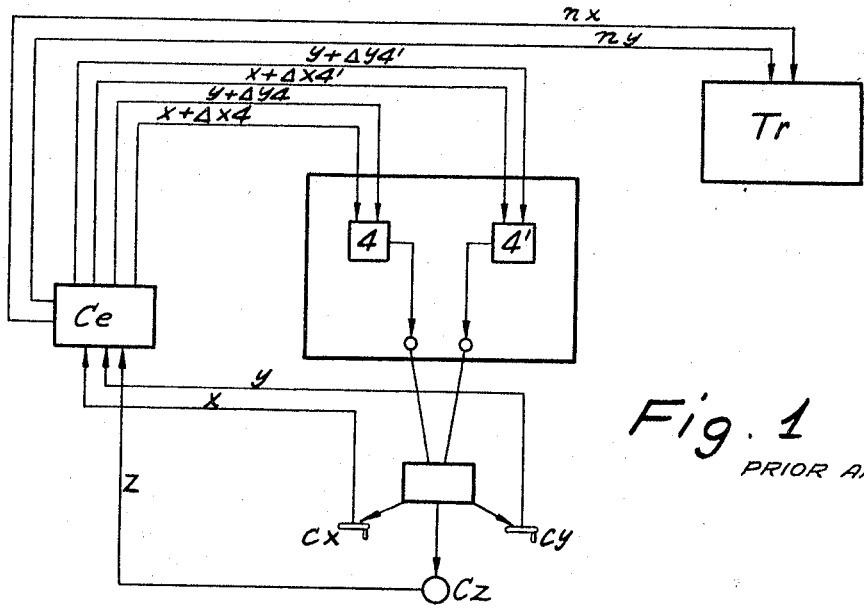
FIG. 1 is the block diagram of a conventional analytic restituter according to the cited patents, said diagram illustrating the operation of the apparatus as regards the transmission of the information.

In the block diagram of FIG. 1, $cx$, $cy$, $cz$ respectively indicate the "control $x$," the "control $y$" and the "control $z$," $Ce$ indicates the electronic computer, 4 and 4' indicate the two plates or photographic films, $Tr$ indicates the tracing table.

Operation is easy to be understood by simply observing the diagram.

Figure 2:
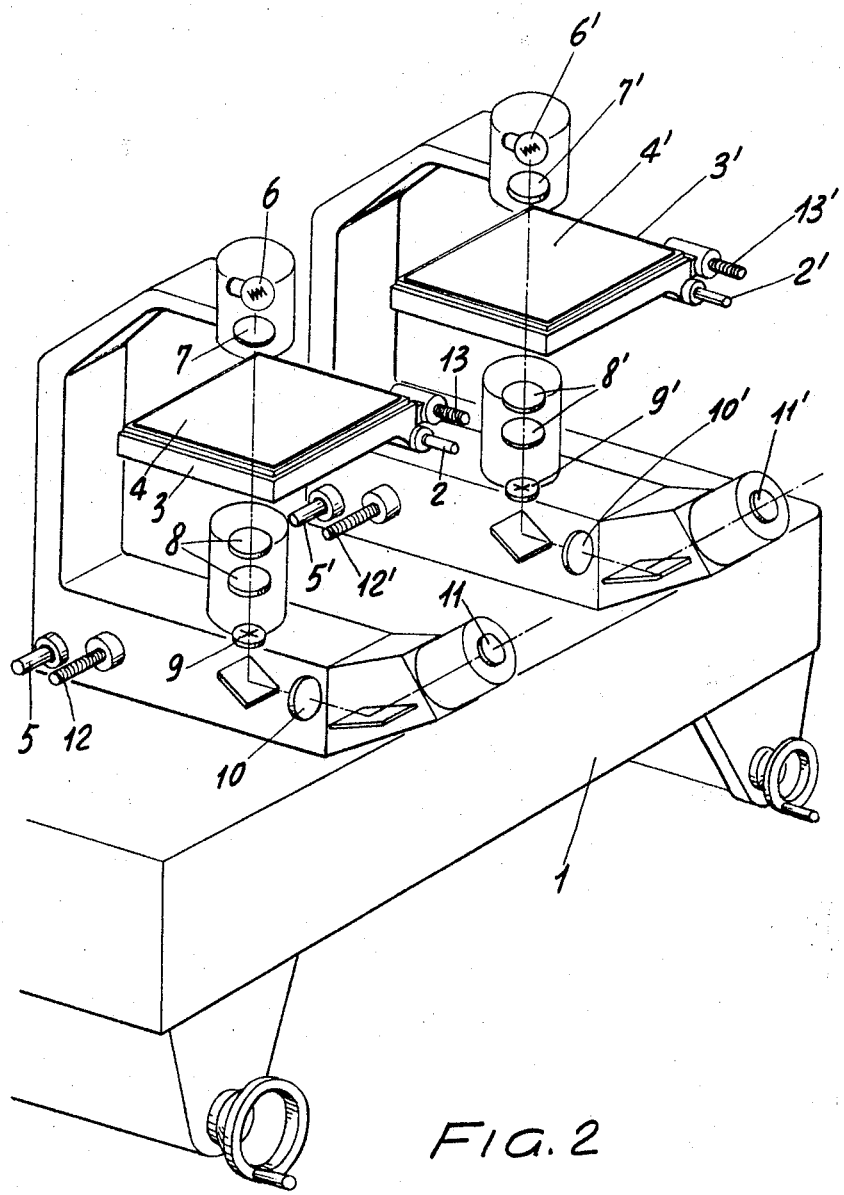
FIG. 2 is a view of the structure of a stereocomparator forming a part of the analytic restituter of FIG. 1 and adapted to be used in connection with the present invention.

FIG. 2 shows the stereocomparator which comprises a base 1 having mounted thereon all the mechanical stationary and movable parts to be used for reaching the appointed goal. Said base supports two systems of guides disposed along the cartesian coordinates of the two plates 4 and 4' under examination (FIG. 1). The horizontal coordinate is indicated with X, as usual, the vertical one with V. The guides 2 and 2' disposed along the Y-coordinate have two photograph-carriers 3–3' sliding thereon which are adapted to support the plates or films 4–4' relative to the pair from which the stereoscopic model is to be obtained. The guides 5, 5', directed along the coordinate X, have two optical observation systems sliding thereon, consisting each of an illumination unit (lamp 6—condenser 7), of a lens 8, for focusing the image of the plate 4 on the reference mark 9, and of an optic observation group (lens 10—ocular 11). The movements along the X and Y coordinates are controlled by precision screws 12 and 13 which cause the displacement of the above mentioned carriages. Said screws are controlled by servomechanisms, which, as mentioned under (a), receive the information in the form of electric pulses corresponding to the plate coordinates i.e. to the model coordinates algebraically added to the corrections due to the orientations of the plates and calculated, as previously mentioned, by the electronic computer.

The application which serves to obtain the orthophotogram is made on just one of the plate-carrier groups. To describe the operation thereof reference is made to FIG. 3 wherein there is shown the right plate only of the stereocomparator with the related optical system according to the present invention. The same reference numerals as in the preceding figure are used. The goal to be aimed to in the realization of an orthophotogram is to take the images from the photograph (which have been obtained by means of a conical projection such as the one which is obtained by photographing through a lens) and to reproduce same on a plane as if the photograph, instead of having been obtained by a lens (the center of which is the center of the conical projection), would have been obtained by means of parallel rays perpendicular to the horizontal reference plane.

For this purpose it is obviously sufficient to have the photograph reproduced on a plane on which the points corresponding to the ones of the original photograph have coordinates which are proportional not to the photographic coordinates but to the model coordinates such as the ones obtained in the tracing on the drawing table Tr (see FIG. 1).

To this end the following procedure is pursued: A slot 14 is provided in correspondence to the carriage of the X coordinate (optical observation system) and fixed thereto, said slot 14 being illuminated by means of an incandescent lamp 15, the collimated beam being projected through the objective 9' and a semi-reflecting glass 16 on the plate under examination so that its larger dimension is directed along the Y-coordinate. Upon having gone through the photogram the light from said slot is made to deviate through a second semi-reflecting glass 17 normal to its previous direction and is sent towards an objective or lens 18, the purpose of which is to transform the rays coming from the slot into parallel rays. A second objective 19, disposed on the optical axis of the above mentioned system, has the purpose of re-constructing the image of the slot at a predetermined distance.

The second objective 19 is an objective of variable focal length so that its enlargement ratio between the dimension of the slot on the photographic plate and that of its image on the focal plane may be varied in the same measure as the ratio which is required between the photograph and the photoplane.

The variation of the focal length of the objective 19 is also effected during the restitution automatically by a servo-motor 20 directly fed by the computer. In fact the enlargement ratio must also take into account the variations due to the height of the ground at the different points of the model.

A cylinder 21 is placed at the focal plane of the above mentioned objective and tangent thereto, said cylinder being mounted so as to be able to rotate about its own axis and to translate along same. Said cylinder, if disposed as illustrated in the figure, will have its axis parallel to the major dimension of the slot so that the development of its lateral surface will correspond to the coordinate X while the height of the cylinder will correspond to the Y coordinate of the photographs. The cylinder will have wound thereon the paper or the film which is intended to receive the images that will form the orthophotogram.

Both the rotation and the translation of the cylinder are controlled by servomechanisms 22, 23 corresponding exactly to those controlling the tracing table.

Figure 4:
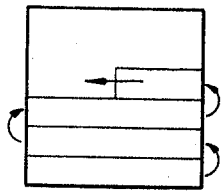
FIG. 4 is a scanning diagram of the invention.

The dimensions of the image of the slot 14 on the cylinder plane may be varied by replacing the slot 14 itself. Let us now suppose that the optical model, constituted by the two plates 4, 4' precedingly oriented as briefly described in the introduction, is scanned along the X coordinate by successive passages, as diagrammatically shown in FIG. 4. This operation corresponds to what is usually described as tracing of profiles. The operator, following the pattern of the ground actuates the altitude wheel (Z) so as to maintain the mark on the ground thereby describing the profile corresponding to the central part of the surface scanned by the slot. The movements which the operator has the mark perform in order to maintain it on the profile of the ground are transmitted to the objective 19 of variable focal length, as has been previously mentioned.

Figure 3:
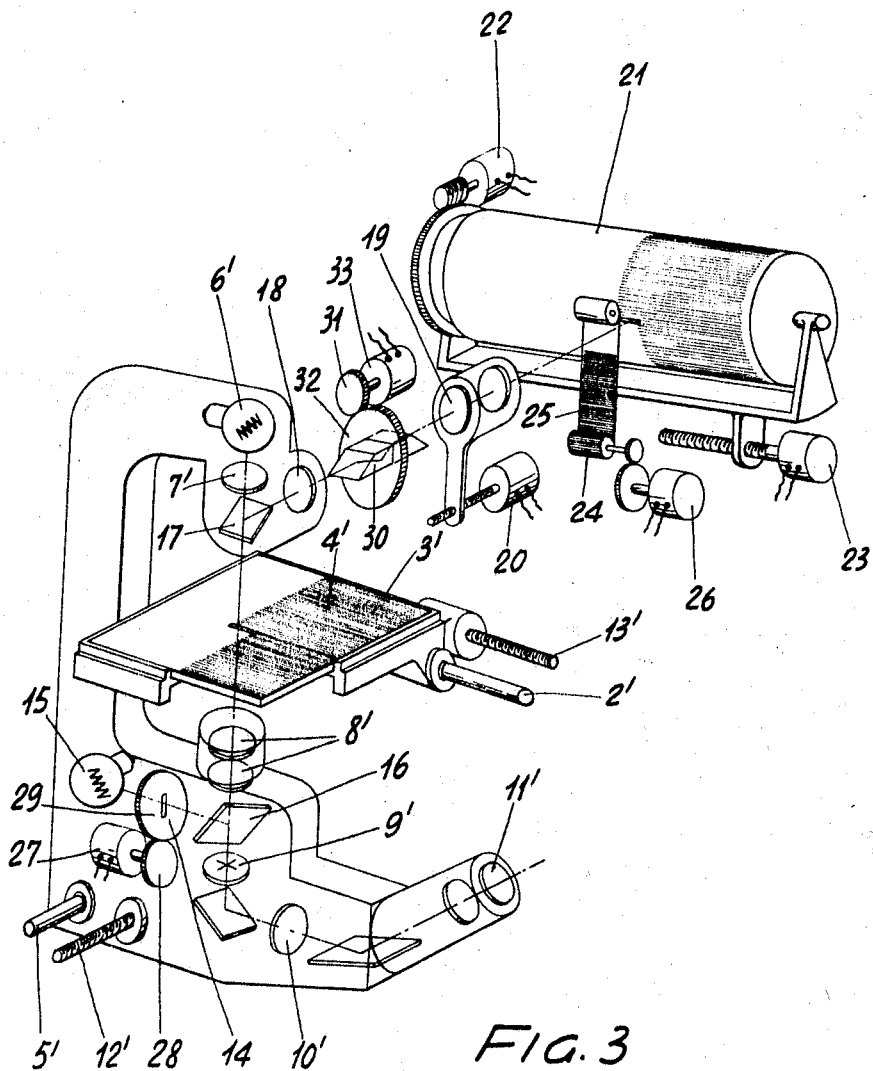
FIG. 3 is a part of the stereocomparator of FIG. 2 as modified according to the present invention to obtain the orthophotogram.

Obviously, the interval between the successive passages must be set according to the length one has chosen for the slot, said length as well as the length of its image on the cylinder being in the same ratio as the focal lengths of the objectives 18 and 19 of FIG. 3.

The scale ratio, which has been introduced in the computer for the tracing table and hence for the drum carrying the sensitive surface must also correspond to the above mentioned ratio of the objectives 18 and 19.

The necessity of regulating the length of the slot in the Y-coordinate and as a consequence thereof the interval between the successive scanning passages is determined by the fact that said length must be much smaller the larger are the irregularities of the photographed ground. This must be so in order to reduce the parallax error deriving from the level difference which may appear in a same slot length.

In this manner the paths followed by the slot image on the drum are proportional to the paths which the tracing pencil would follow on the tracing table. Therefore the final image is planimetrically identical to the image of the model as it would be reproduced on the drawing table and is therefore orthoscopic.

During the scanning of the ground effected through the successive passages as described, the operator has the opportunity of watching over the stereoscopic image of the ground and hence of following with the mark the Z-coordinate (height) as is usually done in the normal tracing of profiles so that he is able to maintain also the planimetric image in a correct position as a function of the ground elevation.

Since the tracing of profiles may be more or less difficult according to the unevenness of the ground and since the scanning along the X coordinate is usually done by means of a variable speed control device, said device being connected with a density variator 24 having a band 25 capable of gradual blackening, the unwinding thereof is controlled by a servomotor 26 which is connected to the control device for the translation speed along X so that to a higher translation speed it corresponds a smaller absorbing density of the band 25.

This is necessary in order for the uniformity of density of the exposed orthophotograms not to show the effects of the different speeds of scanning.

Figure 5:
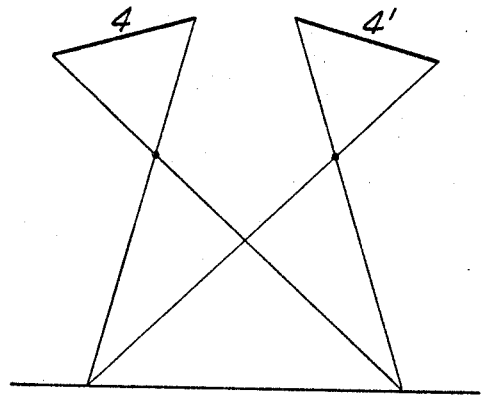
FIG. 5 shows the relation of non-planimetric photographs to a projection plane.
Figure 6:
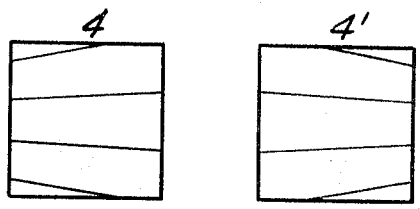
FIG. 6 shows the arrangement of polar coordinates in the projection plane of FIG. 5.

In the case of non planimetric photographs the perspective effect on the photographs reveals itself in a rotation of the image with respect to the principal axes of the plate. The phenomenon is indicated in FIGS. 5 and 6 in which is shown the disposition of the polar rays as a function of the inclination of the photograph axes. To avoid such a rotation producing some deformations on the details of the photoplanes there have been added the devices for the rotation of the slot which are described hereinafter (with reference to FIG. 3).

The slot 14 is capable of rotation in its plane controlled by a servomotor 27 through a pair of gears 28, 29. The control of said rotation comes from the computer which calculates the value thereof as a function of the angulation of photograph. Thus, the image of the slot is rotated in the plane of the plate the same amount as the polar rays through the considered point. However, since said rays must be rectified on the orthophotogram, a prism 30 of Wollaston type is located in the path of the parallel rays passing between the two objectives 18 and 19. Said prism is controlled by the gears 31, 32 by means of the servomotor 33 which has the same controls as the servomotor 27.

The ratio between the gears 31 and 32 must be half the ratio between the gears 28, 29 since, as is well known, the rotation caused of the image by the Wollaston prism is twice as great as the rotation of said prism. In this way the image of the plate, which is made to rotate as a result of the above mentioned perspective effect is produced as rectified on the orthophotogram so that the geometry of the image will appear to be correct.

What is claimed is:

1. In an apparatus for producing cylindrical projections of stereo pairs of photographs in conical projection from successive aerial photographs, comprising an analytic restituter having a stereo comparator with two plates each movable along two cartesian coordinates by means of precision screws controlled by a previously programmed electronic computer; the improvement comprising means defining a slot for scanning one of the two photographs, means for projecting the image scanned by the slot on a sensitive surface, said projecting means comprising an optical enlargement system, said enlargement system including means for automatically varying the enlargement ratio between the size of the slot on the scanned photograph and the size of the image of the slot on said sensitive surface as a function of the elevation of the scanned portion of the photographed contour.

2. Apparatus as claimed in claim 1, said means for automatically varying the enlargement ratio comprising an objective lens of variable focal length, and a servomotor for varying said focal length, said servomotor being controlled by said computer according to said elevation.

3. Apparatus as claimed in claim 2, and a lens ahead of said objective lens for transforming rays from said slot into parallel rays, and a rectifying Wollaston prism between said last-named lens and said objective lens.

4. Apparatus as claimed in claim 1, and means mounting said slot-defining means for rotation in a plane perpendicular to the direction of the rays passing through the slot, and means controlled by said computer for rotating said slot-defining means in accordance with the orientation of the polar rays on the scanned photograph.

5. Apparatus as claimed in claim 1, and means for varying the intensity of the light passing through said slot.

References Cited

UNITED STATES PATENTS 2,869,419   1/1959   Bean _____ 88—24

NORTON ANSHER, *Primary Examiner.*

W. A. SIVERTSON, *Assistant Examiner.*

U.S. Cl. X.R.

355—52